Sept. 17, 1929.　　　K. R. J. LAGUS　　　1,728,570
CUTTER FOR BARK REMOVING MACHINES AND THE LIKE
Filed July 14, 1927
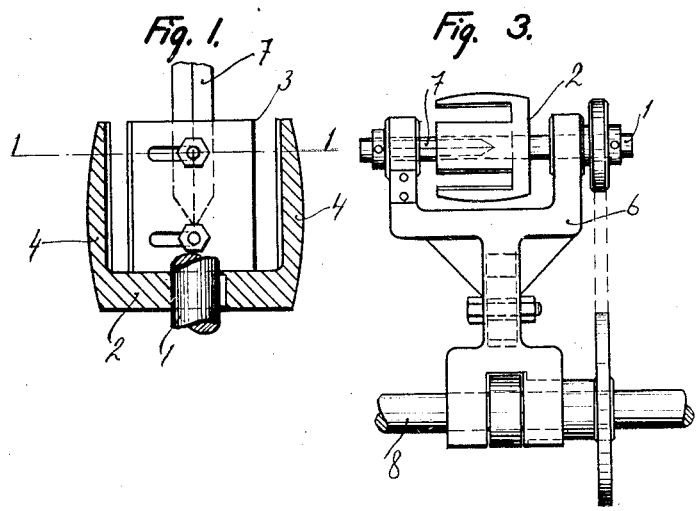
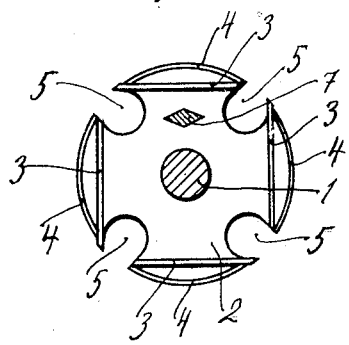
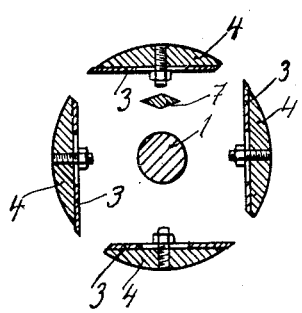
K. R. J. Lagus
INVENTOR
By: Markot&Clarke
ATTYS.

Patented Sept. 17, 1929

1,728,570

UNITED STATES PATENT OFFICE

KNUT ROBERT JOHAN LAGUS, OF ABO, FINLAND

CUTTER FOR BARK-REMOVING MACHINES AND THE LIKE

Application filed July 14, 1927, Serial No. 205,765, and in Finland May 17, 1927.

This invention relates to a cutter for bark removing machines, which cutter is specially constructed for the purpose of facilitating the removal of the detached bits of bark from the cutter and preventing the same from collecting in the cutter and blocking it. For this reason the cutter is open at one end, so that the cut off bits of bark can be cast out of the cutter. Through the open end of the cutter, a part stretches into the cutter and prevents the detached bits of bark from collecting in the cutter. The part in question is fastened in the cutter holder and placed in such a way, that in spite of its stretching into the cutter, it does not hinder the cutter's rotation.

In the accompanying drawing a suitable embodiment is shown of a cutter according to this invention. Fig. 1 is a section through the cutter in the direction of the shaft, and Fig. 2 shows the cutter from one end. Fig. 3 is a plan view of the cutter and the cutter holder. Fig. 4 is a cross-section along the line 1—1 in Fig. 1.

The cutter at one end has a wall or an end piece 2, which is fastened on a rotatable shaft 1 and which is firmly connected with or made in one piece with a number of (according to the drawing four) parts 4 supporting the cutter blades 3. The cutter blades 3 are adjustably arranged on these parts 4. The cutter is open at its other end, so that the removed pieces of bark can be easily got rid of. In the wall or end piece 2 there are hollows 5, situated between the cutter blades 3 (Fig. 2). In the cutter holder 6 (Fig. 3) is fastened a part 7, which is substantially parallel with the cutter shaft 1, and stretches through the open end of the cutter into the cutter between the cutter blades 3 and the cutter shaft 1. The part 7, which does not participate in the cutter's rotation, keeps the cutter free from the removed pieces of bark, so that these may not collect in the cutter.

In a known way the cutter holder 6 is movable on a shaft 8 forwards and backwards along the work piece, and the shaft 1 with the cutter is caused to rotate by a suitable arrangement.

Having now described my invention, what I claim as new and desire to secure by Letters Patent is:

1. A cutter for removing bark, the combination with a shaft, bearings for said shaft, a cutter carrier mounted on said shaft comprising a disk member and spaced axially arranged blade carriers formed on said disk member extending parallel to said shaft and spaced therefrom, of means carried by one of said bearings extending into the space between the blade carriers and the shaft to remove the cuttings from such space and means to rotate said shaft.

2. A cutter for removing bark as claimed in claim 1 in which the means for removing the cuttings comprises a rigid rod-like member.

3. A cutter for removing bark as claimed in claim 1 in which the means for removing the cuttings, comprises a rigid rod-like member having a cross section of substantially greater length than width and having its greater dimension extending perpendicular to a radius of the device.

In witness whereof, I have hereunto signed my name.

KNUT ROBERT JOHAN LAGUS.